UNITED STATES PATENT OFFICE 2,634,200

HERBICIDAL COMPOSITION

Arthur H. Schlesinger, Dayton, Ohio, assignor to Monsanto Chemical Company, St. Louis, Mo., a corporation of Delaware No Drawing. Application December 26, 1951, Serial No. 263,481

13 Claims. (Cl. 71—2.5)

The present invention provides new and highly valuable herbicidal compositions and methods of destroying or preventing plant growth in which said compositions are employed.

I have found that improved, very efficient herbicidal compositions are obtained when there are prepared oil-in-water emulsions of a ketone having the formula

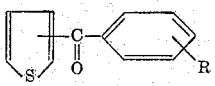

in which R is selected from the class consisting of hydrogen and alkyl radicals of from 1 to 5 carbon atoms. Compounds having the above formula include 2-thienyl phenyl ketone, 3-thienyl phenyl ketone, 2-thienyl 4-tolyl ketone, 2-thienyl 2-ethylphenyl ketone, 3-thienyl 4-isopropylphenyl ketone, 2-thienyl 4-n-butylphenyl ketone, 2-thienyl 4-tert-amylphenyl ketone, etc. The compounds are prepared in known manner, e. g., by reaction of thiophene with the appropriate acyl halide.

Herbicidal compositions containing the present thienyl ketones are readily obtained by first preparing a solution of the ketone in an organic solvent and then adding the resulting solution to water containing an emulsifying agent to form an emulsion. Because of the very high herbicidal efficiency of the ketone they are present in the herbicidal composition in only very small concentrations, for example, in concentrations of from 0.1 per cent to 2 per cent by weight of the total weight of the emulsion. Emulsifying agents which may be employed are those customarily used in the art for the preparation of oil-in-water emulsions. The word "oil" is here used to designate any liquid which is insoluble in water. Since the present ketones are highly stable compounds of little chemical reactivity, they are not affected by either ionic or nonionic emulsifying agents. Examples of emulsifying agents which may be used include alkylbenzenesulfonates, long chained polyalkylene glycols, long chained succinates, etc. The emulsions may be used to destroy already existing plant growth by direct application to the undesirable plants, e. g., by spraying; or the emulsions may be employed to prevent plant growth by application to media which normally support plant growth. When employed to prevent plant growth for example in parking areas, highway abutments, railway yards, etc., the emulsions may be applied by spraying only the surface of said media or they may be admixed with said media. Generally, spraying of only the soil surface is sufficient to prevent plant growth in areas which are to be kept clear of plants. However the emulsions may be incorporated into customarily employed temporary surfacing materials, e. g., oils, cinders, etc.

The present invention is further illustrated, but not limited, by the following examples:

Example 1

Spray testing of the present herbicidal compositions was conducted as follows:

A cyclohexanone solution of 2-thienyl phenyl ketone and an emulsifying agent were added to water, the quantity of solution employed being calculated to give an emulsion containing 1.0 per cent of 2-thienyl phenyl ketone, based on the weight of the total emulsion. The quantity of emulsifying agent used was 0.2 per cent by weight, based on the weight of the total emulsion. Said emulsifying agent comprised a mixture of a polyalkyleneglycol derivative and an alkylbenzenesulfonate.

Three-week old corn and bean plants were sprayed with the emulsion, two plants of each variety being employed. The spraying was continued until droplets formed on and/or fell from, the foliage and stems of the sprayed plants, up to 15 ml. of the emulsion being applied to each plant. The sprayed plants as well as two untreated "blank" specimens of each plant were then allowed to remain under standard conditions of sunlight and watering for a period of one week. At the end of that time the sprayed plants were compared with the untreated plants in order to determine the extent of injury, if any. The sprayed bean plants were found to be severely injured, with leaves dried. The sprayed corn plants were completely dead.

Example 2

Another method of testing for herbicidal efficiency of a chemical involves noting the effects on seed germination and plant growth which may be evidenced by spraying soil surfaces. This test, commonly known as a "pre-emergence test" was conducted as follows:

Boxes having a 5″x5″ exposed areas were partially filled with a layer of soil and 20 seeds were placed thereon and then covered with a ¼″ to ½″ layer of soil which had been screened to ¼″ sieve. Test boxes containing 20 seeds each of cucumber, beet, radish and rye seeds, respectively, were prepared. The surface soil of the seeded boxes was then sprayed, respectively, with the 1.0 per cent emulsions of Example 1 and a similarly prepared 0.3 per cent emulsion of the 2-thienyl phenyl ketone. The quantity of each emulsion which was applied was calculated to correspond to either 20 lbs. of the ketone per acre or to 50 lbs./acre. In the present instance, 10.8 cc. of the 0.3 per cent emulsion per 25 square inches of surface soil was calculated to correspond to 20 lbs. of the chemical per acre and 9.1 cc. of the 1.0 per cent emulsion to 50 lbs. of the chemical per acre. The sprayed boxes as well as similar seeded but unsprayed boxes were then maintained at standard conditions of temperature and watering for a period of two weeks. At the end of that time the number of healthy seedlings in each box was counted. Thus the number of seedlings in the sprayed boxes compared to the number of non-emerging and damaged seedlings was obtained by difference. This difference is designated as "X." "Per cent phytotoxicity" was determined by the ratio of "X" to the number of healthy seedlings in the controls.

There was evidenced a 100 per cent phytotoxicity to all four test specimens at the 50 lbs./acre rate of application. At the 20 lbs. rate there was evidenced a phytotoxicity of up to about 70% against beets, a phytotoxicity of up to about 45% against cucumber and rye and less than 20% phytotoxicity against radish.

While the present ketones are most advantageously employed as herbicides by incorporating them into an aqueous emulsion as herein described, they may also be employed in other plant destroying methods. Thus they may be incorporated into solid carriers such as clay, talc, pumice and bentonite to give herbicidal compositions which may be applied to living plants or to surfaces which are to be freed from plant growth. The ketones may also be mixed with liquid or solid agricultural pesticides, e. g., insecticides and fungicides. While solutions of the ketones in organic solvents may be employed for preventing and destroying plant-growth, I have found that the emulsions possess an improved tendency to adhere to the treated surfaces and that less of the active ingredients, i. e., the ketones, is required to give comparable herbicidal efficiency.

What I claim is:

1. A herbicidal composition comprising an oil-in-water emulsion of a ketone having the formula

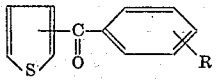

in which R is selected from the class consisting of hydrogen and alkyl radicals of from 1 to 5 carbon atoms, said ketone being present in said emulsion in a quantity which is toxic to plant life.

2. A herbicidal composition comprising an oil-in-water emulsion of 2-thienyl phenyl ketone, said ketone being present in said emulsion in a quantity which is toxic to plant life.

3. The method of destroying undesirable plants which comprises applying to said plants a toxic quantity of a herbicidal composition comprising a ketone having the formula

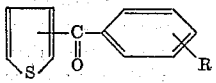

in which R is selected from the class consisting of hydrogen and alkyl radicals of from 1 to 5 carbon atoms.

4. The method of destroying undesirable plants which comprises applying to said plants a toxic quantity of a herbicidal composition comprising an oil-in-water emulsion of a ketone having the formula

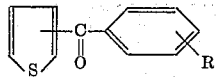

in which R is selected from the class consisting of hydrogen and the alkyl radicals of from 1 to 5 carbon atoms.

5. The method of destroying undesirable plants which comprises applying to said plants a toxic quantity of a herbicidal composition comprising 2-thienyl phenyl ketone.

6. The method of destroying undesirable plants which comprises applying to said plants a toxic quantity of a herbicidal composition comprising an oil-in-water emulsion of 2-thienyl phenyl ketone.

7. The method of preventing plant growth which comprises applying to media normally supporting said growth a herbicidal composition comprising a ketone having the formula

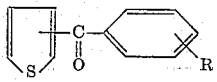

in which R is selected from the class consisting of hydrogen and alkyl radicals of from 1 to 5 carbon atoms.

8. The method of preventing plant growth which comprises applying to media normally supporting said growth an oil-in-water emulsion of a ketone having the formula

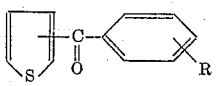

in which R is selected from the class consisting of hydrogen and alkyl radicals of from 1 to 5 carbon atoms.

9. The method of preventing plant growth which comprises applying to soil normally supporting said growth a herbicidal composition comprising a ketone having the formula

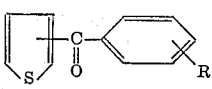

in which R is selected from the class consisting of hydrogen and alkyl radicals of from 1 to 5 carbon atoms.

10. The method of preventing plant growth which comprises applying to media normally supporting said growth a herbicidal composition comprising 2-thienyl phenyl ketone.

11. The method of preventing plant growth which comprises applying to media normally supporting said growth an oil-in-water emulsion of 2-thienyl phenyl ketone.

12. The method of preventing plant growth which comprises applying to soil normally supporting said growth a herbicidal composition comprising 2-thienyl phenyl ketone.

13. The method of preventing plant growth which comprises applying to soil normally supporting said growth an oil-in-water emulsion of 2-thienyl phenyl ketone.

ARTHUR H. SCHLESINGER.

No references cited.